(12) United States Patent
Braunheim et al.

(10) Patent No.: US 12,305,599 B2
(45) Date of Patent: May 20, 2025

(54) FILTER DEVICE

(71) Applicant: MAHLE International GmbH, Stuttgart (DE)

(72) Inventors: Michael Braunheim, Goeppingen (DE); Torsten Lika, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/211,521

(22) Filed: Jun. 19, 2023

(65) Prior Publication Data
US 2023/0332567 A1    Oct. 19, 2023

Related U.S. Application Data

(63) Continuation of application No. 17/078,700, filed on Oct. 23, 2020, now abandoned, which is a
(Continued)

(30) Foreign Application Priority Data

Sep. 15, 2009  (DE) .......................... 102009041523.8

(51) Int. Cl.
| | | |
|---|---|---|
| *B01D 35/153* | (2006.01) |
| *B01D 29/11* | (2006.01) |
| *B01D 35/00* | (2006.01) |
| *B01D 35/16* | (2006.01) |
| *B01D 35/30* | (2006.01) |
| *B01D 36/00* | (2006.01) |
| *F02M 37/24* | (2019.01) |
| *F02M 37/42* | (2019.01) |
| *B01D 17/04* | (2006.01) |

(Continued)

(52) U.S. Cl.
CPC ............. *F02M 37/42* (2019.01); *B01D 29/11* (2013.01); *B01D 35/005* (2013.01); *B01D 35/153* (2013.01); *B01D 35/16* (2013.01); *B01D 35/30* (2013.01); *B01D 36/003* (2013.01); *B01D 36/006* (2013.01); *F02M 37/24* (2019.01); *B01D 17/045* (2013.01); *B01D 27/00* (2013.01); *B01D 27/08* (2013.01); *B01D 2201/291* (2013.01); *B01D 2201/295* (2013.01); *B01D 2201/305* (2013.01); *B01D 2201/4007* (2013.01); *B01D 2201/4053* (2013.01); *B01D 2201/4084* (2013.01); *F01M 11/03* (2013.01)

(58) Field of Classification Search
CPC ........ F02M 37/42; F02M 37/24; B01D 29/11; B01D 35/005; B01D 35/153; B01D 35/16; B01D 35/30; B01D 36/003; B01D 36/006; B01D 17/045; B01D 27/00; B01D 27/08; B01D 2201/291; B01D 2201/295; B01D 2201/305; B01D 2201/4007; B01D 2201/4053; B01D 2201/4084; F01M 11/03
USPC ........ 210/232, DIG. 5, 450, 493.2, 455, 248
See application file for complete search history.

(56) References Cited

U.S. PATENT DOCUMENTS

| | | | | |
|---|---|---|---|---|
| 6,139,738 A | * | 10/2000 | Maxwell ................ | B01D 35/26 210/DIG. 17 |
| 6,706,181 B1 | * | 3/2004 | Baumann ............... | F01M 11/03 210/454 |

* cited by examiner

*Primary Examiner* — Madeline Gonzalez
(74) *Attorney, Agent, or Firm* — Fishman Stewart PLLC

(57) ABSTRACT

A filter device includes a functional element and a filter element arranged in a filter housing. The filter element includes an enclosure positioned about a central axis and below filter material of the filter element. The enclosure includes an enclosure wall that defines an inner volume that
(Continued)

is in fluid communication with an orifice of the functional element when the filter element is positioned over the functional element.

20 Claims, 3 Drawing Sheets

Related U.S. Application Data continuation of application No. 16/569,935, filed on Sep. 13, 2019, now Pat. No. 10,871,133, which is a continuation of application No. 16/049,506, filed on Jul. 30, 2018, now Pat. No. 10,456,721, which is a continuation of application No. 15/135,203, filed on Apr. 21, 2016, now Pat. No. 10,279,289, which is a continuation of application No. 13/496,250, filed as application No. PCT/EP2010/062585 on Aug. 27, 2010, now Pat. No. 9,333,448.

(51) Int. Cl.
*B01D 27/00* (2006.01)
*B01D 27/08* (2006.01)
*F01M 11/03* (2006.01)

FILTER DEVICE

CROSS-REFERENCE TO RELATED APPLICATIONS

This application is a continuation of U.S. patent application Ser. No. 17/078,700, filed on Oct. 23, 2020, which is a continuation of U.S. patent application Ser. No. 16/569,935, filed on Sep. 13, 2019 and issued as U.S. Pat. No. 10,871,133 on Dec. 22, 2020, which is a continuation of U.S. patent application Ser. No. 16/049,506, filed Jul. 30, 2018 and issued as U.S. Pat. No. 10,456,721 on Oct. 29, 2019, which is a continuation of U.S. patent application Ser. No. 15/135,203, filed Apr. 21, 2016 and issued as U.S. Pat. No. 10,279,289 on May 7, 2019, which is a Continuation of U.S. patent application Ser. No. 13/496,250, filed May 30, 2012 and issued as U.S. Pat. No. 9,333,448 on May 10, 2016, which is a National Stage of International Application No. PCT/EP2010/062585 filed Aug. 27, 2010, which claims priority to German Patent Application 10 2009 041 523.8 filed on Sep. 15, 2009, the contents of all of which are hereby incorporated by reference in their entireties.

TECHNICAL FIELD

The present invention relates to a filter device having a ring filter element arranged in a filter housing in an upright manner, which ring filter element has an upper and a lower end disc, in accordance with the introductory clause of claim 1. The invention further relates to a ring filter element for such a filter device.

BACKGROUND

A generic filter device is sufficiently known and is to be found in almost all modern motor vehicles, used for example as an oil- or fuel filter.

In order to be able to guarantee a problem-free filter effect, it is often important for the manufacturers of such filter devices that only filter elements which have been authorized or produced by them are used. With the use of filter elements of external brands or imitations, namely not only can be filter performance be impaired, but at the same time also damage can be caused. On the other hand, it is desirable to be able to produce and offer filter elements for such filter devices at as favourable a cost as possible.

The present invention is therefore concerned with the problem of providing for a filter device of the generic type an improved or at least an alternative embodiment, which in particular enables exclusively the use of authorized filter elements.

This problem is solved according to the invention by the subjects of the independent claims. Advantageous embodiments are the subject of the dependent claims.

SUMMARY

The present invention is based on the general idea of providing a ring filter element, known per se, which is arranged in an upright manner in a filter housing of a filter device, with a dirt pot on the base side, on which a protruding, nozzle-shaped pin is constructed, by which the ring filter element engages into a channel provided on a filter housing pot or on a functional element, in so far as the ring filter element is correctly mounted. The dirt pot is arranged here on the lower end disc of the ring filter element, wherein the socked-shaped pin is constructed in one piece with the dirt pot, and an operation of the filter device is then enabled exclusively in so far as the pin of the dirt pot engages into the channel on the filter housing pot side or respectively on the functional element side. The dirt pot and hence also the socked-shaped pin are preferably constructed here in one piece or in one part with a lower end disc of the ring filter element, in particular the dirt pot is welded onto the lower end disc of the ring filter element, for example by means of friction welding, ultrasonic welding or laser welding. A water separator is provided in addition inside the dirt pot, so that the dirt pot per se can be used both as a dirt-collecting chamber and also as a water-collecting chamber, and has on the base side at least one outlet for collected dirt or respectively for collected water. With the filter device according to the invention it is therefore possible that it can only be used in so far as ring filter elements which fit it are used with the pin on the dirt pot side; the use of other ring filter elements by which under certain circumstances the filter performance of the filter device could be impaired, can therefore be reliably prevented.

In an advantageous further development of the solution according to the invention, the water separator which is arranged inside the dirt pot is constructed as a coalescer and at the same time is welded onto the lower end disc of the ring filter element. Such a coalescer is able to collect and divert water particles and therefore for example to filter out water components present in the fuel, so that these can not arrive into the combustion engine and cause corrosion damage there. In this case, the filter device can be constructed for example as an oil- or fuel filter, wherein quite generally a construction as an air filter is also conceivable. The water separator is connected here to the lower end disc of the ring filter element, in particular is welded on, and can thereby be exactly positioned and fixed before the assembly or respectively before the closing of the dirt pot, which distinctly simplifies the manufacturing process of the filter device according to the invention.

In a further advantageous embodiment of the solution according to the invention, a guide is provided on the filter housing pot or on a functional element arranged therein, along which guide the pin of the dirt pot is guided on mounting of the ring filter element to the channel. Such a guide can be constructed for example in the manner of an incline, which enables an arbitrary insertion of the ring filter element, so that the latter slides by means of the pin along the guide into the channel and thereby a correct mounting can always be guaranteed. Such a guide can be realized on the one hand at a favourable cost, for example by a suitable injection mould, and on the other hand guarantees a distinctly simplified handling of the filter device according to the invention, because the ring filter element can be inserted into the filter housing pot in an arbitrary rotation angle position and can be transferred by a simple twisting into its proper and correct position. An incorrect mounting of the ring filter element can be thereby reliably ruled out.

Further important features and advantages of the invention will emerge from the subclaims, from the drawings and from the associated description of the figures with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
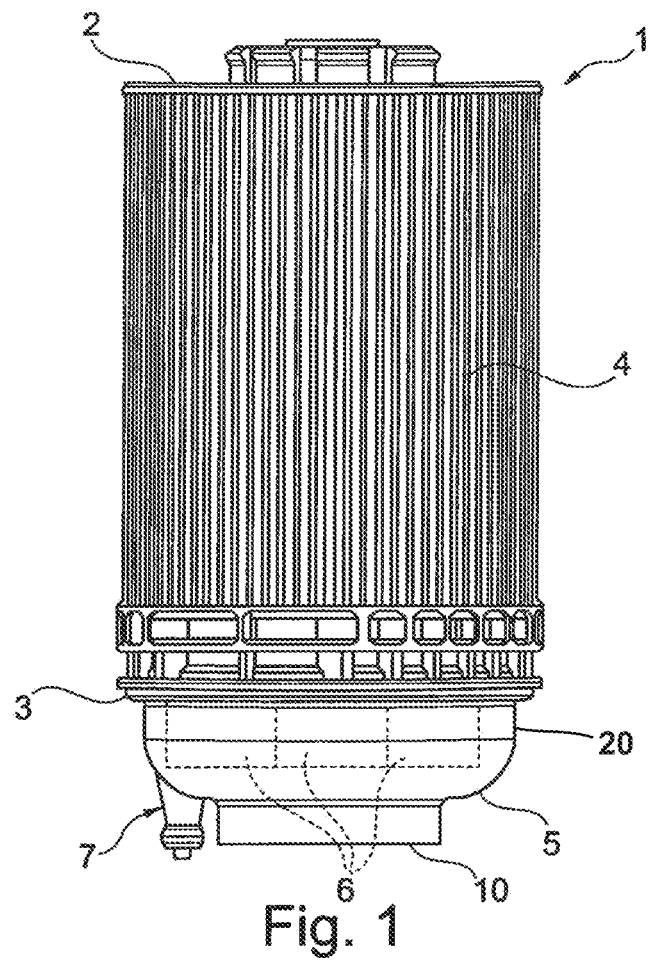
FIG. 1 a ring filter element according to the invention, in a side view.

In accordance with FIG. 1, a ring filter element 1 according to the invention has an upper end disc 2 and a lower end disc 3. Between the two end discs 2 and 3 a filter material 4 is arranged, for example in the manner of a pleated star. The ring filter element 1 is arranged here in a similar manner to the illustration in FIG. 1 in an upright manner in a filter housing, not shown, of a filter device, for example an oil- or fuel filter. According to the invention, on the lower end disc 3, an enclosure such as a dirt pot 5 is now provided, having a water separator 6 arranged therein and only sketched by a dashed line. A nozzle-shaped pin 7 is provided protruding downward on the dirt pot 5, which pin is constructed in a complementary manner to a channel 9 constructed on the filter housing pot, which is not shown, or on a functional element 8 (cf. FIG. 2) which is able to be inserted into this filter housing pot which is not shown. An operation of the complete filter device is then possible here exclusively in so far as the pin 7 engages into the channel 9, which can be constructed in particular as an idle channel.

Figure 2:
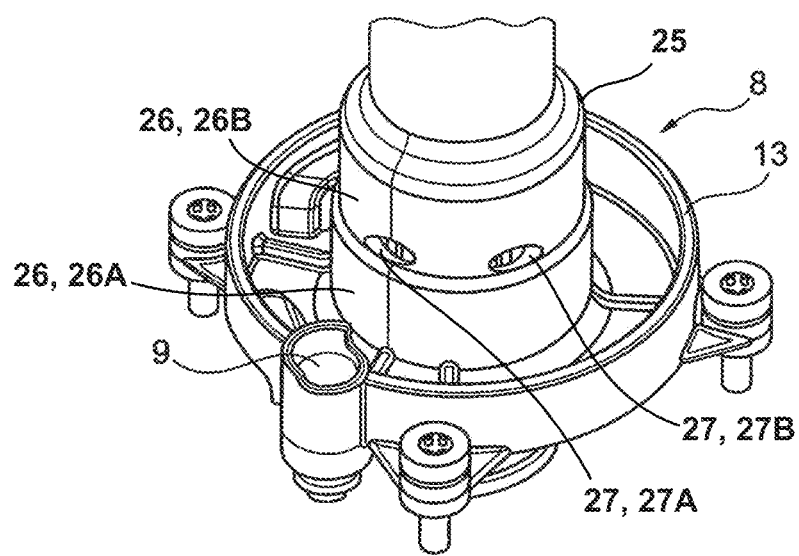
FIG. 2 a view onto a functional element.
Figure 3:
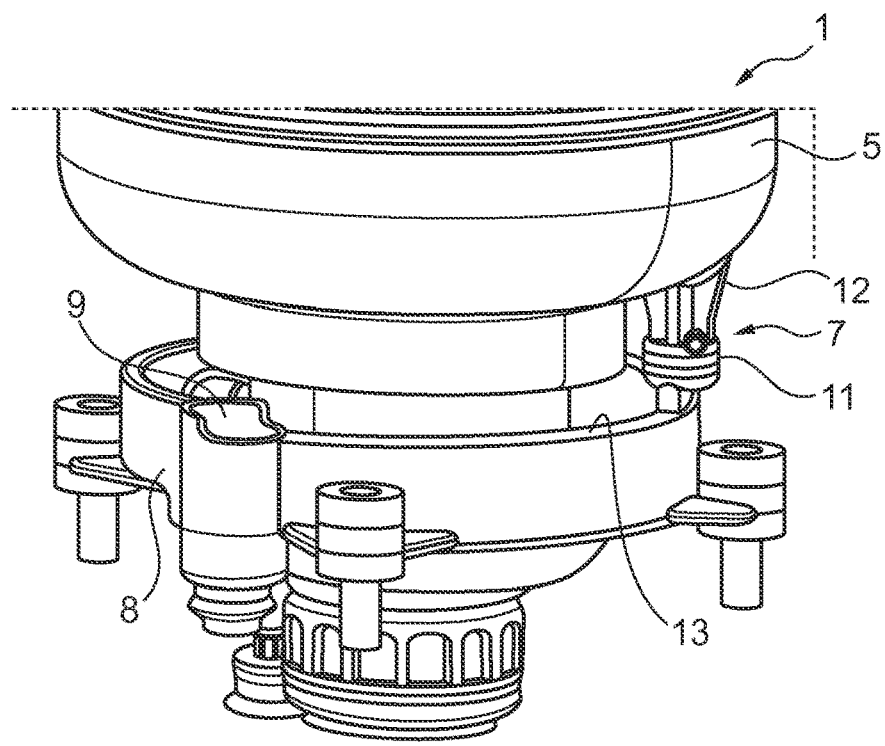
FIG. 3 a cooperation of the ring filter element with the functional element.
Figure 4:
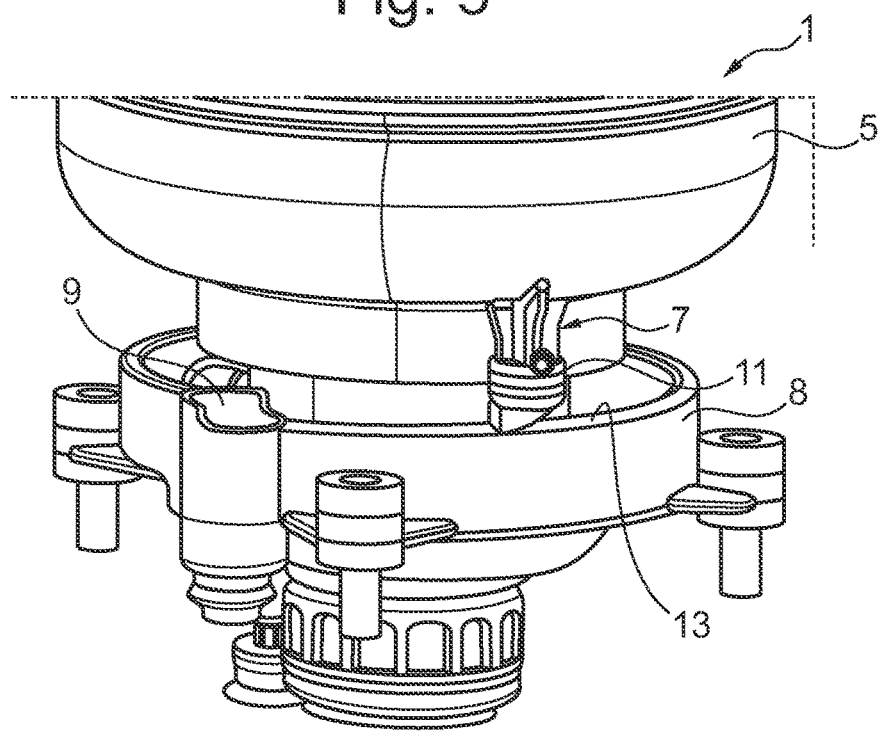
FIG. 4 an illustration as in FIG. 3, but with a different rotation angle position of the ring filter element, FIG. 5 a detail illustration of a pin, projecting in a nozzle shape, of the ring filter element before immersion into an associated channel, FIG. 6 an illustration as in FIG. 5, but after the immersion of the pin into the channel.
Figure 5:
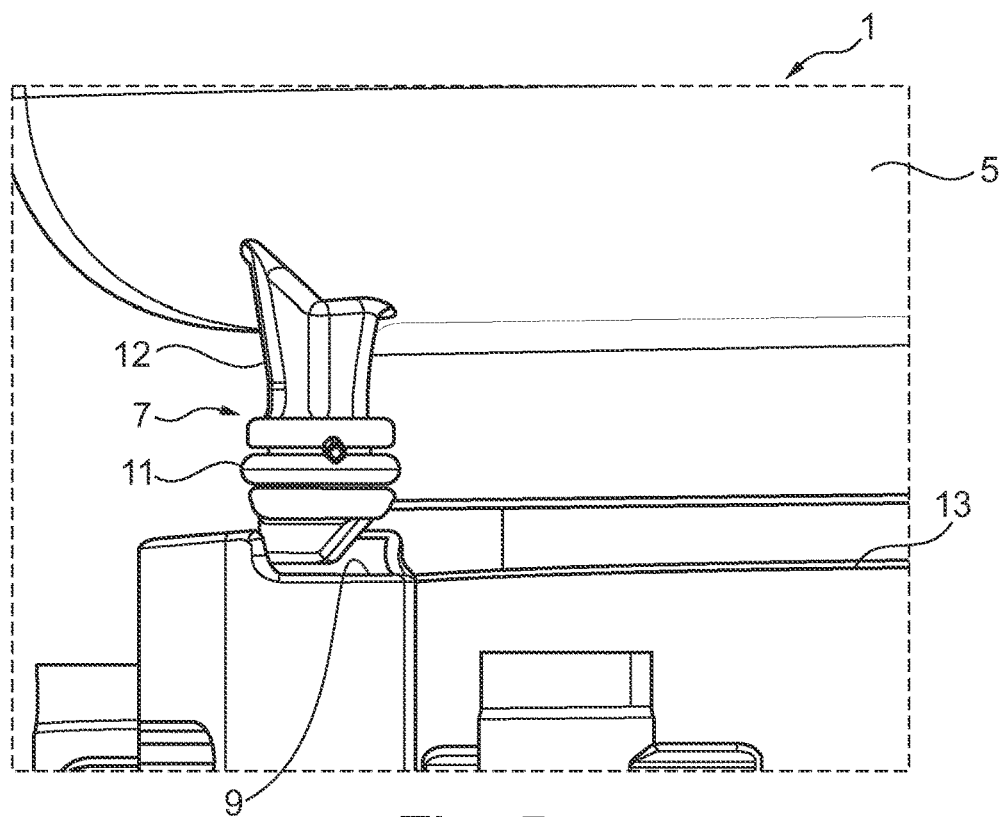
Figure 6:
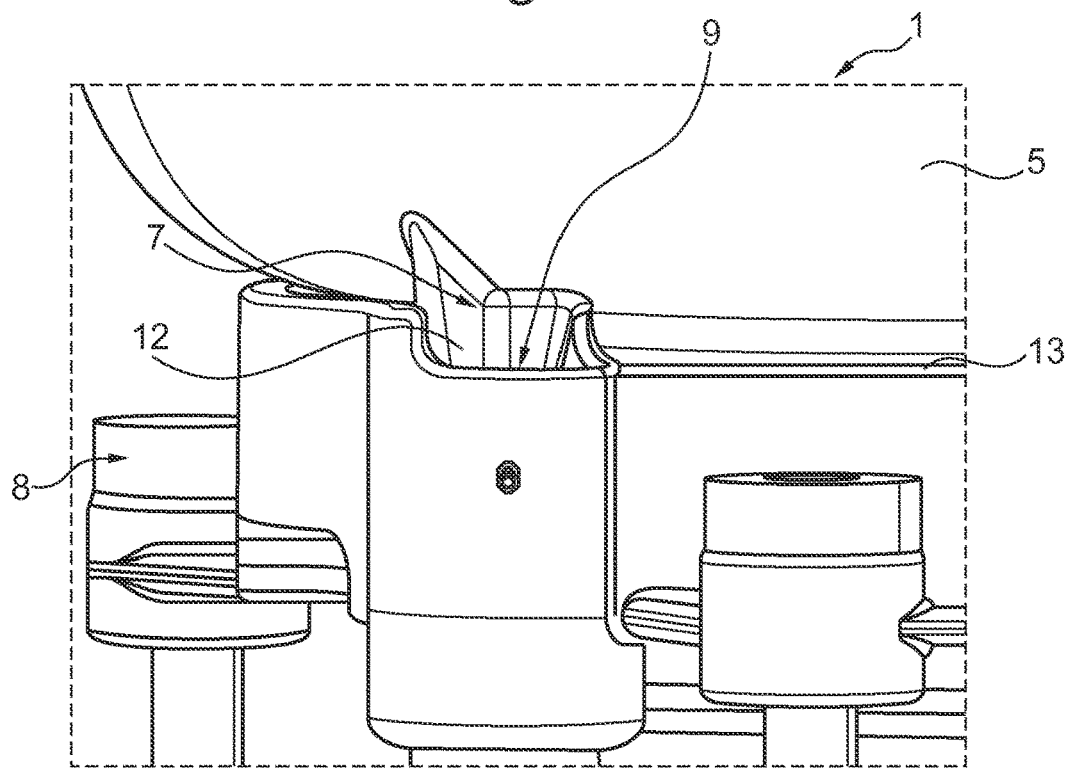

Generally, the water separator 6 can be constructed as a so-called coalescer and can be welded to the lower end disc 3 of the ring filter element 1. The welding can take place for example by means of ultrasonic welding, friction welding or laser welding and guarantees a reliable positioning and fixing of the water separator 6 on the lower end disc 3 of the ring filter element 1, so that in a subsequent working step the dirt pot 5 (e.g., an enclosure and/or pot wall 20 thereof) can be connected with the end disc 3, in particular welded. Of course, a welding of the water separator 6 to the lower end disc 3 after the welding of the dirt pot 5 to the lower end disc 3 is also conceivable, wherein in this case the water separator 6 must be subsequently introduced through an opening 10 of the dirt pot 5 on the base side. The opening 10 may receive at least a portion of a projection 25 of the functional element 8 (see, e.g., FIGS. 3-6). As generally illustrated in FIG. 2, the functional element 8 and/or the projection 25 thereof has an outer circumferential surface 26 with a first axial location and/or region 26A and a second axial location and/or region 26B disposed axially above the first axial location and/or region 26A. The functional element 8 and/or the projection 25 also includes at least one orifice 27 (e.g., a first orifice 27A and a second orifice 27B) disposed in the outer circumferential surface 26 (e.g., in the second axial location and/or region 26B).

On viewing FIGS. 1 and 3 to 5, it can be seen that on the pin 7, i.e. in particular on its pin head, at least one sealing element 11 is arranged which tightly closes the channel 9 with the pin 7 engaging therein. The at least one sealing element 11 can be constructed here for example as a conventional O-ring seal. On viewing FIG. 5, it can be seen that the pin 7 has a shaft 12 which is cruciform in cross-section, and that the pin has the previously mentioned pin head adjoining thereto, wherein the cross-section profile of the shaft 12 gives the pin 7 a high degree of rigidity. For the correct introduction of the pin 7 in the channel 9, a guide 13 can be provided on the filter housing pot or on the functional element 8, with which guide in the best case the pin 7 slides along with low friction to the channel 9. The guide 13 can be constructed here for example in the manner of an incline.

The invention not only relates here to a complete filter device, consisting of filter housing and filter housing pot and functional element 8 arranged therein and ring filter element 1, but also to the ring filter element 1 as a separate component, in particular for the spare parts market. Through the construction of the ring filter element 1 in one piece together with the dirt pot 5 and in particular through the construction of the pin 7 and of the dirt pot 5 in one part, a complete part can therefore be produced, in particular also for the spare parts market, which on the one hand is favourably priced and which on the other hand guarantees that no unsuitable and non-authorized brands are used, which can weaken the filter performance and thereby, under certain circumstances, can cause damage. Of course, both the pin element 7 and also the dirt pot 5 can be constructed here from favourably priced plastic, in particular as a plastic injection moulded part. In the illustrations, the channel 9 is constructed as an idle channel.

The invention claimed is:

1. A filter assembly having a rotational center defined by a central axis of the filter assembly, comprising:
    a functional element including:
        an outer circumferential surface extending about the central axis and defining a first axial location and a second axial location, the second axial location positioned above the first axial location and having an orifice between the first axial location and the second axial location; and
        a channel for receiving a pin, the channel spaced radially outward from the central axis of the filter assembly and radially beyond the outer circumferential surface; and
    a filter element positionable over the functional element, the filter element including:
        an upper end disc;
        a lower end disc;
        a filter material arranged between the upper end disc and the lower end disc;
        an opening about the central axis, the opening configured to fit over the outer circumferential surface;
        a coalescer positioned axially above the opening and about the central axis at a first radial distance from the central axis, the coalescer positioned such that the coalescer is able to collect and divert water particles to filter out water components present in fuel when the filter element is positioned over the functional element; and
        an enclosure positioned about the central axis and below the filter material, the enclosure having an enclosure wall that is at a second radial distance from the central axis that is greater than the first radial distance, the enclosure wall at least partially defining an inner volume that is in fluid communication with the orifice of the functional element when the filter element is positioned over the functional element;

wherein the pin is attached to the filter element at a radially outward distance from the opening for guiding the filter element to be correctly mounted with the functional element; and wherein the pin extends away from the filter material, and has a seal that extends into the channel to seal within the channel when the filter element is correctly mounted with the functional element.

2. The filter assembly of claim 1, wherein the enclosure is a dirt pot.

3. The filter assembly of claim 1, wherein the opening is located at a base side of the filter element.

4. The filter assembly of claim 1, wherein the seal includes a sealing element positioned in a groove of the pin.

5. The filter assembly of claim 4, wherein the sealing element is an O-ring.

6. The filter assembly of claim 4, wherein the sealing element is arranged at a sealing element axial location that is approximately axially aligned with an axial location of the opening.

7. The filter assembly of claim 1, wherein the outer circumferential surface is sealed against an inner surface defining the opening.

8. The filter assembly of claim 1, wherein the functional element further includes an axially facing guide against which the pin slides during assembly of the filter element into a filter housing.

9. The filter element of claim 8, wherein when the seal is positioned in the channel the opening of the filter element is concurrently positioned over the outer circumferential surface so that no unsuitable or non-authorized brands are used in the filter housing.

10. The filter element of claim 1, wherein the enclosure collects both dirt and water.

11. A method of assembling the filter assembly according to claim 1, comprising:
aligning the opening of the filter element with the outer circumferential surface of the functional element;
adjusting at least one of the filter element and the functional element such that the outer circumferential surface of the functional element is inserted into the opening of the filter element;
mounting the filter element onto the functional element;
positioning the pin of the filter element within the channel of the functional element when the opening of the filter element passes over the outer circumferential surface; and
sealing the pin against the channel as the filter element and the opening lowers below the orifice of the functional element.

12. The method of claim 11, wherein an end of the pin extends below the enclosure.

13. The method of claim 11, further comprising sliding the pin against a guide of the functional element during the assembly of the filter element into a filter housing.

14. The method of claim 11, further comprising concurrently positioning the filter element over the outer circumferential wall and sealing the pin in the channel so that no unsuitable or non-authorized brands are used in the filter housing.

15. The method of claim 11, further comprising positioning the enclosure below the filter material to be used as both a dirt-collecting chamber and also as a water-collecting chamber.

16. A filter assembly having a rotational center defined by a central axis of the filter assembly, comprising:
a functional element including:
a projection having an outer circumferential surface extending about the central axis and an orifice disposed in the outer circumferential surface, the outer circumferential including a first axial region and a second axial region disposed axially above the first axial region; and
a channel for receiving a pin, the channel disposed spaced radially outward from the central axis and the outer circumferential surface; and
a filter element positionable over the functional element, the filter element including:
an upper end disc;
a lower end disc;
a filter material arranged between the upper end disc and the lower end disc;
an opening overlapping the central axis and configured to receive at least a portion of the projection of the functional element;
a coalescer positioned axially above the opening and about the central axis at a first radial distance from the central axis, the coalescer positioned such that the coalescer is able to collect and divert water particles to filter out water components present in fuel when the filter element is positioned over the functional element; and
an enclosure positioned about the central axis and below the filter material, the enclosure having an enclosure wall that is at a second radial distance from the central axis that is greater than the first radial distance, the enclosure wall at least partially defining an inner volume that is in fluid communication with the orifice of the functional element when the filter element is positioned over the functional element;
wherein the pin is attached to the filter element at a radially outward distance from the opening for guiding the filter element to be correctly mounted with the functional element; and
wherein the pin extends away from the filter material, and has a seal that extends into the channel to seal within the channel when the filter element is correctly mounted with the functional element.

17. A filter assembly, comprising a longitudinal axis, a functional element, and a filter element removably arranged over the functional element, wherein:
the functional element includes:
a projection having an outer circumferential surface extending about the longitudinal axis and an orifice disposed in the outer circumferential surface; and
a channel disposed spaced radially farther from the longitudinal axis than the outer circumferential surface;
the filter element includes:
an upper end disc;
a lower end disc;
a filter material arranged between the upper end disc and the lower end disc;
an opening arranged coaxially with the longitudinal axis, the opening configured to receive at least a portion of the projection of the functional element;
a coalescer configured to filter out water components present in fuel, the coalescer disposed axially spaced apart from the opening and extending about the longitudinal axis at a first radial distance from the longitudinal axis;

an enclosure disposed on an axially opposite side of the lower end disc than the filter material, the enclosure including an enclosure wall extending about the longitudinal axis at a second radial distance from the longitudinal axis that is greater than the first radial distance, the enclosure wall at least partially defining an inner volume that is in fluid communication with the orifice of the functional element; and a pin extending away from the filter material and disposed spaced apart from the opening in a radially outward direction, the pin structured and arranged to guide installation of the filter element and facilitate proper mounting of the filter element with the functional element; and the pin extends into and seals the channel when the filter element is properly mounted with the functional element.

18. The filter assembly of claim 17, wherein an end of the pin extends beyond the enclosure.

19. The filter assembly of claim 17, wherein the enclosure is a dirt pot.

20. The filter element of claim 17, wherein the enclosure collects both dirt and water.

\* \* \* \* \*